United States Patent
Sugimoto et al.

(10) Patent No.: US 6,780,370 B2
(45) Date of Patent: Aug. 24, 2004

(54) PROCESS FOR PRODUCING MICROCERAMIC TUBES BY RADIATION EXPOSURE OF SILICON-BASED POLYMERS

(75) Inventors: Masaki Sugimoto, Gunma (JP); Akira Idesaki, Gunma (JP); Kiyohito Okamura, Osaka (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 10/241,391

(22) Filed: Sep. 11, 2002

(65) Prior Publication Data

US 2003/0057612 A1 Mar. 27, 2003

(30) Foreign Application Priority Data

Sep. 12, 2001 (JP) ........................................ 2001-276175

(51) Int. Cl.⁷ ................................................. H05B 6/00

(52) U.S. Cl. ........................ 264/434; 264/430; 264/624; 264/627

(58) Field of Search ................................ 264/430, 434, 264/624, 627

(56) References Cited

U.S. PATENT DOCUMENTS 4,283,376 A * 8/1981 Yajima et al.
5,171,735 A * 12/1992 Chien

* cited by examiner

Primary Examiner—Christopher A. Fiorilla
(74) Attorney, Agent, or Firm—Banner & Witcoff, Ltd.

(57) ABSTRACT

A process for producing a SiC ceramic microtube by oxidizing the surface of an organosilicon polymer to become infusible by exposure to an ionizing radiation, extracting the uncrosslinked central portion of the fiber with an organic solvent to make a hollow silicon polymer fiber, and firing it in an inert gas so that it acquires a ceramic nature.

16 Claims, 2 Drawing Sheets

PROCESS FOR PRODUCING MICROCERAMIC TUBES BY RADIATION EXPOSURE OF SILICON-BASED POLYMERS

This application is based upon and claims the benefit of priority from Japanese Patent Application No. 2001-276175, filed Sep. 12, 2001, the entire contents of this application are incorporated herein by reference.

BACKGROUND OF THE INVENTION

This invention relates to a process for producing microceramic tubes of silicon carbide (SiC) and silicon nitride (SiN) with diameters ranging from several microns to several hundred microns.

Silicon carbide is a material having high heat resistance, high strength and low reactivity and silicon carbide fiber synthesized from silicon-based polymers has already been commercialized. Active research efforts are being made to study SiC composite materials reinforced with SiC fiber.

SiC tubes are currently prepared by one of the following four methods: 1) making hollow fibers by mechanical working; 2) shaping cylinders by CVD (chemical vapor deposition); 3) making use of self-assembly; and 4) spinning hollow fibers from special nozzles.

The fiber diameter that can be realized by the first method which depends on mechanical working is no smaller than several hundred microns and it is difficult to prepare tubes with diameters on the micron order. The second method which depends on CVD involves difficulty in mass production. The third method which depends on self-assembly can only produce tubes with diameters on the nano order. The fourth technique which prepares hollow fibers by spinning is not suitable for melt spinning of organosilicon-based polymers. Thus, no techniques have been established that can produce ceramic tubes with diameters ranging from 10 microns to several hundred microns.

SUMMARY OF THE INVENTION

An object, therefore, of the invention is to provide a process by which ceramic tubes with diameters ranging from several microns to several hundred microns can be easily prepared through the steps of applying an ionizing radiation to a silicon-based polymer such that only its surface layer is rendered infusible and then firing the polymer.

DETAILED DESCRIPTION OF THE INVENTION

Noting that oxygen was preferentially introduced into the surface of a silicon-based polymer polycarbosilane (PCS) upon exposure to an ionizing radiation in an oxygen atmosphere, the inventors found that the central part of fibers prepared by melt spinning the thus treated polycarbosilane could selectively be extracted with a solvent. The present invention has been accomplished on the basis of this finding.

In order to extract the interior of a fiber with a solvent, it is required that the amount of crosslinks in the PCS molecular chains in the surface should be more than a specified value, creating a state (gel) which is insoluble in solvent. Crosslinks can be formed by one of three methods:

thermal oxidation in which the molecular chains are crosslinked with oxygen in a heated oxidizing atmosphere;

the molecular chains are directly crosslinked by radiation exposure in an inert gas; and introducing oxygen by radiation exposure in an oxidizing atmosphere.

In the second approach involving radiation exposure in an inert gas, the fiber is crosslinked uniformly throughout, so it is impossible to ensure that only the central part of the fiber is extracted to form a tube. Radiation exposure of polycarbosilane causes uniform generation of active radicals; if oxygen is present in the ambient atmosphere, the active radicals generated react with oxygen to produce peroxy radicals. Given high radiation dose, radicals react with oxygen in the surface of the fiber at a faster rate than the diffusion of oxygen into the interior of the fiber, thus making it difficult for oxidation to proceed into the interior of the fiber. Therefore, if the surface layer of PCS is selectively crosslinked by oxidation, one can synthesize a silicon polymer fiber the interior of which can be selectively extracted with a solvent.

The SiC fiber has very high elasticity and strength whereas an uncrosslinked PCS fiber is very fragile and brittle; hence, it is difficult to control the length of either type of fiber by cutting. On the other hand, the crosslinked PCS fiber is not only stronger than the uncrosslinked PCS fiber—by a factor of at least ten or so—but it is also supple. Therefore, it can be easily cut or otherwise worked and its length can be controlled within the range from several microns to several millimeters or more.

Figure 1:
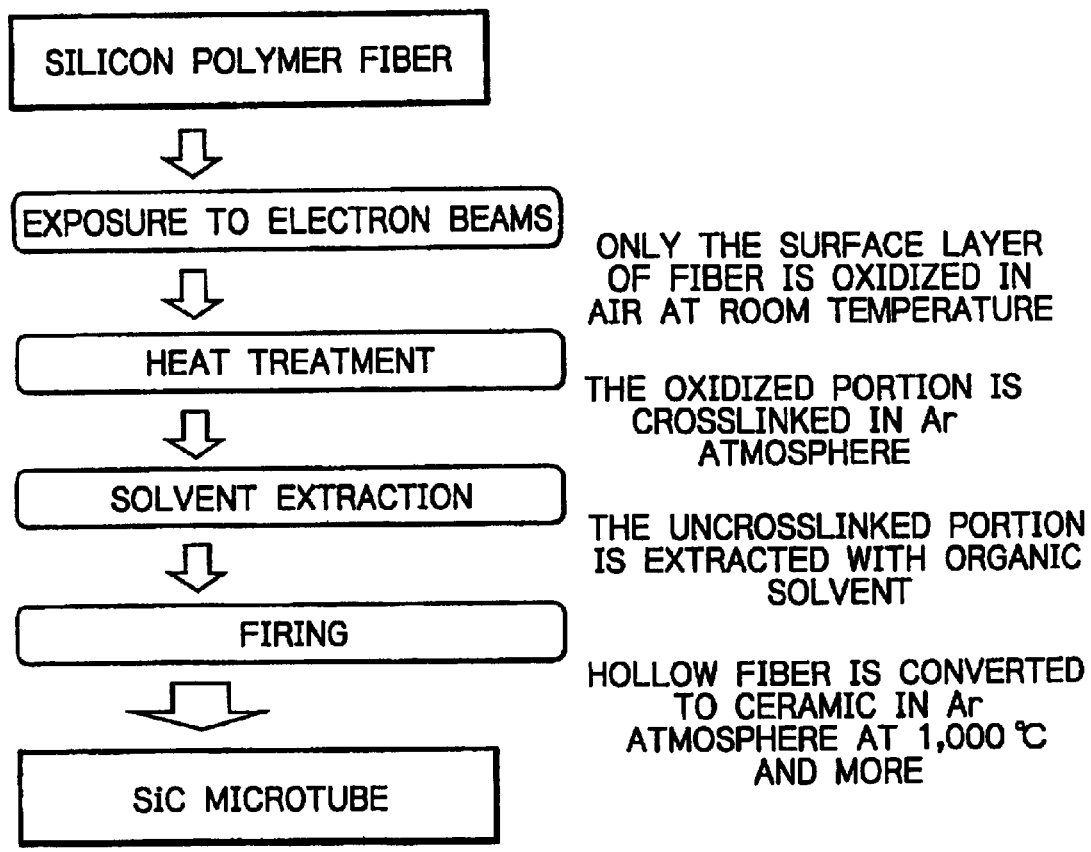
FIG. 1 is a flowsheet for an exemplary process for producing a ceramic tube according to the invention.

FIG. 1 is a flowsheet for an exemplary process for producing a microceramic tube by radiation exposure according to the invention. A silicon polymer fiber is oxidized by exposure to electron beams in air at room temperature. If the temperature of the fiber rises due to the energy of electron beams, the rate of oxygen diffusion in the silicon polymer increases and oxidation proceeds to the interior of the fiber and, at the same time, thermal oxidation of the silicon polymer proceeds, making it difficult to control the concentration of oxygen and its distribution in the fiber in the direction of its cross sectional. Therefore, in order to achieve controlled oxidation of the surface layer of the silicon polymer fiber, it is desirably held at 100° C. or below during radiation exposure.

In the next step, the oxidized silicon polymer fiber is heat treated in an argon atmosphere, whereby crosslinks are formed by the oxygen introduced into the fiber. The heat treatment may be performed in vacuum. If the temperature is lower than 500° C., crosslinking does not proceed satisfactorily; if the temperature is higher than 700° C., the silicon polymer itself starts to become inorganic and even that portion of the fiber which does not contain oxygen becomes insoluble in solvent. Hence, an optimum temperature for the heat treatment should be determined within the range of 500–700° C. considering the concentration of oxygen introduced and the fiber diameter.

In order to extract the uncrosslinked portion of the fiber, the latter is held in an organic solvent such as tetrahydrofuran (THF), xylene or benzene that solubilize the silicon polymer. In the subsequent firing step, the fiber is heat treated up to 1,000° C. or higher in an argon atmosphere until the silicon polymer acquires an inorganic ceramic property. If desired, the fiber may be fired in an ammonia atmosphere to produce a silicon nitride ceramic tube.

The following example is provided for the purpose of further illustrating the present invention but is in no way to be taken as limiting.

EXAMPLE

An organosilicon polymer polycarbosilane (PCS) was melt spun into fiber filaments with a diameter of about 100 microns. The PCS had a molecular weight of about 2,000 and a melting point of 238° C. Its molecular structure is expressed by formula 1:

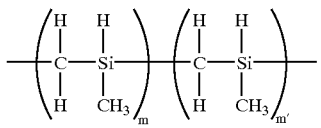

where the ratio of m to m' is about unity.

The filaments were placed on a water-cooled stainless steel plate and exposed to 2 MeV of electron beams for a total dose of 3.6 MGy at a dose rate of 0.9 kGy/sec. After exposure, the filaments were placed in an argon gas and heated up to 650° C., whereupon the polymer was crosslinked by the exposure-introduced oxygen, making the surface layer of the PCS fiber infusible.

Figure 2:
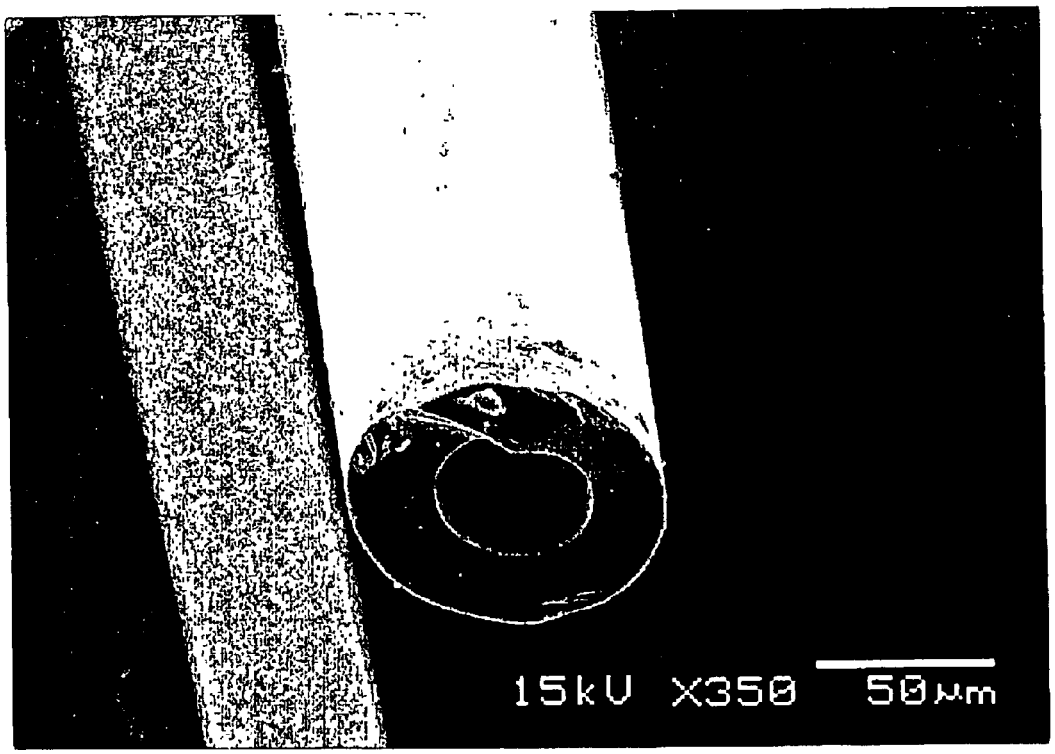
FIG. 2 is a scanning electron micrograph of a ceramic tube prepared by the process of the invention.

After cooling to room temperature, the uncrosslinked central portion of the fiber was extracted with THF to produce a hollow PCS fiber. The fiber was then put into a firing furnace, where it was heat treated up to 1,000° C. in argon gas so that it would acquire a ceramic property. A scanning electron micrograph of the thus produced ceramic SiC tube was taken at an acceleration voltage of 15 kV and at a magnification of 350 (see FIG. 2).

The invention enables ceramic microtubes to be produced from the organosilicon polymer by an existing spinning process. The wall thickness of the microtube can be controlled by adjusting the dose rate of radiation and the irradiation atmosphere and ceramic tubes can be produced at diameters in the range of several microns to several hundred microns which has heretofore been difficult to realize by mechanical working.

What is claimed is:

1. A process for producing a SiC ceramic microtube, comprising:
   (a) oxidizing the surface of a fiber of polycarbosilane cross-linkable by oxygen by exposing the fiber to ionizing radiation in the presence of oxygen;
   (b) heat-treating the surface-oxidized fiber of step (a) in an argon atmosphere or in a vacuum the at a temperature in the range of 500° C.–700° C. to cross-link the oxidized polycarbosilane to form a fiber having a cross-linked surface portion and an uncross-linked polycarbosilane core portion;
   (c) removing the uncross-linked polycarbosilane of the fiber of step (b) by solubilizing it in a solvent for the uncross-linked polymer to form a cross-linked polycarbosilane tube; and
   (d) heating the cross-linked polycarbosilane tube of step (c) at a temperature and for a time sufficient to convert the cross-linked polycarbosilane tube to a ceramic SiC tube.

2. The process according to claim 1, wherein the ionizing radiation is electron beams.

3. The process according to claim 2, wherein the polycarbosilane selectively oxidized in the surface layer is heat treated so that the surface layer is crosslinked whereas only the interior of the fiber becomes extractable to form a cylindrical shape.

4. The process according to claim 3, wherein the polycarbosilane is exposed to an ionizing radiation in such a way that only the surface layer of the irradiated polymer becomes oxidized.

5. The process according to claim 4, wherein the wall thickness of the ceramic tube is controlled by adjusting the dose rate of the ionizing radiation being applied and the concentration of oxygen in the atmosphere for irradiation.

6. The process according to claim 3, wherein the wall thickness of the ceramic tube is controlled by adjusting the dose rate of the ionizing radiation being applied and the concentration of oxygen in the atmosphere for irradiation.

7. The process according to claim 2, wherein the polycarbosilane is exposed to an ionizing radiation in such a way that only the surface layer of the irradiated polymer becomes oxidized.

8. The process according to claim 7, wherein the wall thickness of the ceramic tube is controlled by adjusting the dose rate of the ionizing radiation being applied and the concentration of oxygen in the atmosphere for irradiation.

9. The process according to claim 2, wherein the wall thickness of the ceramic tube is controlled by adjusting the dose rate of the ionizing radiation being applied and the concentration of oxygen in the atmosphere for irradiation.

10. The process according to claim 1, wherein the polycarbosilane selectively oxidized in the surface layer is heat treated so that the surface layer is crosslinked whereas only the interior of the fiber becomes extractable to form a cylindrical shape.

11. The process according to claim 10, wherein the polycarbosilane is exposed to an ionizing radiation in such a way that only the surface layer of the irradiated polymer becomes oxidized.

12. The process according to claim 11, wherein the wall thickness of the ceramic tube is controlled by adjusting the dose rate of the ionizing radiation being applied and the concentration of oxygen in the atmosphere for irradiation.

13. The process according to claim 10, wherein the wall thickness of the ceramic tube is controlled by adjusting the dose rate of the ionizing radiation being applied and the concentration of oxygen in the atmosphere for irradiation.

14. The process according to claim 1, wherein the polycarbosilane is exposed to an ionizing radiation in such a way that only the surface layer of the irradiated polymer becomes oxidized.

15. The process according to claim 14, wherein the wall thickness of the ceramic tube is controlled by adjusting the dose rate of the ionizing radiation being applied and the concentration of oxygen in the atmosphere for irradiation.

16. The process according to claim 1, wherein the wall thickness of the ceramic tube is controlled by adjusting the dose rate of the ionizing radiation being applied and the concentration of oxygen in the atmosphere for irradiation.

* * * * *

UNITED STATES PATENT AND TRADEMARK OFFICE
CERTIFICATE OF CORRECTION

PATENT NO. : 6,780,370 B2
DATED : August 24, 2004
INVENTOR(S) : Maski Sugimoto et al.

It is certified that error appears in the above-identified patent and that said Letters Patent is hereby corrected as shown below:

<u>Column 45,</u>
Line 45, "the" has been removed after the word "vacuum".

Signed and Sealed this

Nineteenth Day of July, 2005

JON W. DUDAS
*Director of the United States Patent and Trademark Office*